(12) United States Patent
Nishihara et al.

(10) Patent No.: US 8,064,130 B2
(45) Date of Patent: Nov. 22, 2011

(54) OPTICAL AMPLIFIER

(75) Inventors: Masato Nishihara, Kawasaki (JP); Yasushi Sugaya, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1290 days.

(21) Appl. No.: 10/351,340

(22) Filed: Jan. 27, 2003

(65) Prior Publication Data

US 2003/0234976 A1 Dec. 25, 2003

(30) Foreign Application Priority Data

Jun. 24, 2002 (JP) ................................. 2002-182750

(51) Int. Cl.
*H04B 10/17* (2006.01)
*H04B 10/12* (2006.01)

(52) U.S. Cl. ............. 359/337.2; 359/337.1; 359/337.21; 359/337.3

(58) Field of Classification Search ............... 359/337.2, 359/341.5, 337.1, 337.21, 337.3
See application file for complete search history.

(56) References Cited

U.S. PATENT DOCUMENTS

| | | | |
|---|---|---|---|
| 5,337,382 A * | 8/1994 | Mizrahi | 385/37 |
| 5,818,629 A | 10/1998 | Kinoshita | |
| 5,920,424 A * | 7/1999 | Espindola et al. | 359/337.21 |
| 6,049,417 A * | 4/2000 | Srivastava et al. | 359/337.4 |
| 6,236,498 B1 | 5/2001 | Freeman et al. | |
| 6,313,941 B1 | 11/2001 | Suzuki et al. | |
| 6,344,425 B1 * | 2/2002 | Aitken | 501/43 |
| 6,356,387 B1 | 3/2002 | Ohtishi et al. | |
| 6,529,316 B1 * | 3/2003 | Treyz et al. | 359/337.11 |
| 6,621,621 B1 * | 9/2003 | Jones et al. | 359/337.11 |
| 6,690,506 B2 * | 2/2004 | Zahnley et al. | 359/337.11 |
| 6,738,183 B2 * | 5/2004 | Shigehara | 359/337.2 |
| 2001/0033413 A1 * | 10/2001 | Lelic et al. | 359/341.4 |
| 2001/0048343 A1 | 12/2001 | Islam | |

(Continued)

FOREIGN PATENT DOCUMENTS

EP 0 897 205 2/1999

(Continued)

OTHER PUBLICATIONS

Ishikawa E et al., "Novel 1500 nm-band EDFA with discrete raman amplifier", Fujitsu Laboratories Ltd., vol. 6, Sep. 30, 2001, pp. 48-49, XP010582870 Kawasaki, Japan.

(Continued)

*Primary Examiner* — Eric Bolda
(74) *Attorney, Agent, or Firm* — Staas & Halsey LLP

(57) ABSTRACT

It is an object of the present invention to provide an optical amplifier using optical amplification mediums each doped with a rare earth element for increasing amplification efficiency of signal light in S-band and the like. To this end, the optical amplifier is constituted such that, when performing optical amplification for S-band and the like in which a center wavelength of a gain peak in the optical amplification medium is located at an outside of a signal band, a gain coefficient of when a pumping condition of the optical amplification medium is maximum is set so that a parameter η obtained by dividing a minimum value of the gain coefficient in the signal band by a maximum value of the gain coefficient outside of the signal band becomes a previously set value or more, wherein, for example, the parameter η can be increased by controlling a temperature of each of a plurality of EDFs between which gain equalizers are disposed.

10 Claims, 12 Drawing Sheets

SECOND EMBODIMENT OF PRESENT INVENTION

U.S. PATENT DOCUMENTS

| | | | |
|---|---|---|---|
| 2002/0001124 A1* | 1/2002 | Kinoshita et al. | 359/337.1 |
| 2002/0197049 A1* | 12/2002 | Baniel et al. | 385/142 |
| 2003/0039026 A1* | 2/2003 | Nishihara et al. | 359/337.4 |

FOREIGN PATENT DOCUMENTS

| | | |
|---|---|---|
| EP | 1 128 504 | 8/2001 |
| EP | 1 209 779 | 5/2002 |
| JP | 04-011794 | 1/1992 |
| JP | 2000-091675 | 3/2000 |
| JP | 2000-124529 | 4/2000 |
| JP | 2001-313433 | 11/2001 |

OTHER PUBLICATIONS

Clark I G et al., "S-band amplifier with variable gain tilt control", Optical Fiber Communication Conference (OFC), Technical Digest PostConference Edition, Anaheim, CA, Mar. 17-22, 2001, Trends in Optics and Photonics Series. Tops. vol. 54, Washington, WA: OSA, US, vol. 2, Mar. 17, 2001, pp. TuQ2-1-TuQ2-3, XP01055813.

Search Report for corresponding European Appln. No. 03001355.1 dated Apr. 27, 2005.

Cover page of Japanese Office Action mailed Mar. 13, 2007 in the Corresponding Japanese application 2002-182750.

Dan Hewak ed., "Properties, Processing and Applications of Glass and Rare Earth-Doped Glasses for Optical Fibres," United Kingdom, The Institution of Electrical Engineers, 1998, pp. 156-158.

A. Mori, et al., "Erbium-doped tellurite glass fibre laser and amplifier," Electronics Letters, IEEE, published on May 8, 1997. vol. 33, No. 10, pp. 863-964.

European Communication Notice of Opposition, European Patent No. 1385279 (mailed Aug. 23, 2007).

"Measuring OSNR in WDM Systems—Effects of Resolution Bandwidth and Optical Rejection Ratio", Next-Generation Network Assessment; 2009.

Decision Revoking the European Patent issued May 6, 2010 in corresponding Application No. 03 001 355.1-2415/138-5279/.

Summons to Attend Oral Proceedings Pursuant to Rule 115 (1) EPC issued Jul. 13, 2009 in corresponding Application No. 03 001 355.1-2415/138-5279/.

* cited by examiner

DIAGRAM FOR EXPLAINING BASIC CONCEPT OF PRESENT INVENTION

FIRST EMBODIMENT OF PRESENT INVENTION

SECOND EMBODIMENT OF PRESENT INVENTION

THIRD EMBODIMENT OF PRESENT INVENTION

OPTICAL AMPLIFIER

BACKGROUND OF THE INVENTION

1. Field of the Invention

The present invention relates to an optical amplifier using an optical amplification medium doped with a rare earth element, and in particular, to an optical amplifier to improve efficiency of optical amplification for a wavelength band that differs from a typical amplification band.

2. Description of the Related Art

An optical amplifier is a device that amplifies input light as it is without converting it into electricity. In an optical amplifier, generally, a wavelength of light to be amplified is limited depending on an applied optical amplification medium. With the increase of the capacity of optical transmission system in recent years, optical wavelength division multiplex transmission, in which signal light of different wavelengths is multiplexed together, has become available. Since the transmission capacity of an optical wavelength division multiplex transmission system depends on the wavelength band in which the optical amplification produces a gain, it is necessary to extend the wavelength band that includes the gain of the optical amplifier. Therefore, it would be desirable to realize an optical amplifier that amplifies a wavelength band that has been considered difficult to amplify previously. As a candidate for a new transmission wavelength band of the optical transmission system, for example, a wavelength band called S-band of from 1480 to 1530 nm is under consideration and the optical amplifier corresponding to S-band is researched actively.

Optical amplifiers for S-band, such as a gain-shifted thulium (Tm)-doped optical fiber amplifiers (GS-TDFA), a-discrete Raman amplifiers and the like are known. GS-TDFA, however, does not have sufficient reliability in fluoride optical fiber, while the Raman amplifier produces a nonlinear effect when high power at the output is suppressed. In such circumstances, one of the promising candidates for technology that enables a practical optical amplifier for S-band is the shift of an amplification band of an erbium doped optical fiber amplifier (EDFA) to S-band.

The EDFA has already been commercially available as an optical amplifier for C-band (1530-1560 nm) and L-band (1570-1610 nm). FIG. 21 exemplarily shows population inversion rate dependence of a relative gain coefficient of a typical erbium doped optical fiber (EDF). Note, the relative gain coefficient in the ordinate is expressed by standardizing a gain per unit length of the EDF. The population inversion rate represents a pumping condition of the EDF, which is a three level system in this case, and can be expressed by a relation shown in the following equation (1).

$$\text{population inversion rate} = Er \text{ ion density of upper level}/\text{total } Er \text{ ion density} \quad (1)$$

In FIG. 21, in a typical EDFA, the EDF is pumped at the population inversion rate in which a gain wavelength characteristic of an amplification band is substantially flat. More specifically, the population inversion rate in a conventional C-band EDFA is about 0.7, and on the other hand, the population inversion rate in an L-band EDFA is about 0.4. Focusing attention on the S-band corresponding to an area enclosed by oblique lines in FIG. 21, it can be seen that the relative gain coefficient becomes positive when the population gain coefficient is 0.7 or more.

However, in the case where the EDFA is applied to the amplification of S-band light as described above, as opposed to the conventional operating condition for C-band or L-band, a problem is caused in that: (a) the gain coefficient becomes maximum at a wavelength outside the amplification band (in the vicinity of 1530 nm), and (b) a population inversion rate does not exist in which the gain wavelength characteristic in the amplification band becomes substantially flat. In particular, with regard to problem (a), ASE (amplified spontaneous emission) light generated in the vicinity of 1530 nm in the EDF is increased, which would be a factor to reduce efficiency. Due to these problems described above, it was practically difficult to increase the gain of S-band in the EDFA.

Therefore, as a measure for solving the problems of the S-band EDFA as described above, the applicant of the present invention proposed a constitution in which the ASE light in the vicinity of 1530 nm is suppressed by inserting optical filters between the EDFs that were connected in multi-stages as shown in FIG. 22, for example (Japanese Unexamined Patent Publication No. 2001-313433 and Japanese Patent Application 2001-252165).

In the constitutional example in FIG. 22, signal light input from an optical transmission path is input via an optical isolator for preventing reflected light and a WDM coupler to the EDFs and optical filters connected in multi-stages. At this time, pumping light from a pumping light source is supplied via the WDM coupler to the EDF serving as an optical amplification medium. The signal light input to the EDF is amplified due to a stimulated emission phenomenon of by Er ion. The ASE light in the vicinity of 1530 nm generated at this time is suppressed by the optical filter having a transmission wavelength characteristic as shown in FIG. 23. Further, a gain deviation occurring at the time of amplification is flattened by the optical filter described above. The signal light having passed through the EDF and optical filters of each stage is output via a WDM coupler and an optical isolator at an output side to the optical transmission path.

However, in the S-band EDFA as described above, although the amplification and growth of the ASE light of a band other than S-band can be suppressed by inserting the optical filters between the multi-staged EDFs, it is difficult to suppress the growth of the ASE light perfectly. Therefore, there is caused a problem in that efficiency of optical amplification is low in comparison with other EDFAs corresponding to other bands.

Further, in order to improve efficiency of the S-band EDFA while securing a required gain, it can be contemplated to keep the ASE light power input to the EDF at each stage as low as possible by increasing the number of the optical filters inserted between the stages, for example, but in this case, there is also caused a problem in that the constitution would be more complicated than that in the conventional EDFA.

SUMMARY OF THE INVENTION

The present invention has been accomplished in view of the above problems, and it is an object of the present invention to provide an optical amplifier using an optical amplification medium doped with a rare earth element, for improving efficiency of optical amplification for a new wavelength band, such as S-band, that enables to realize the extension of a signal band of an optical transmission system, and also for enabling the realization of simplicity of constitution.

In order to achieve the above object, one aspect of the present invention provides an optical amplifier using optical amplification mediums each doped with a rare earth element, for amplifying signal light in a predetermined wavelength band, wherein the optical amplifier has a center wavelength of a gain peak at an outside of a signal band, and a gain coefficient of when a pumping condition of said optical amplification medium is maximum is set so that an efficiency evaluation value obtained by dividing a minimum value of the gain coefficient in the signal band by a maximum value of the gain coefficient at the outside of the signal band becomes a previously set value or more. In the optical amplifier of such a constitution, amplification efficiency of the signal light having the center wavelength of the gain peak at the outside of the signal band can be improved.

The optical amplifier described above is preferably constituted so that the efficiency evaluation value is 0.15 or more. Further, the wavelength band of the signal light may be constituted so that the center wavelength of the gain peak is located at the outside of the signal band on a longer wavelength side, and more specifically, the wavelength band of the signal light can be S-band of from 1480 nm to 1530 nm.

In another aspect of the present invention, the optical amplifier may comprise: a plurality of optical amplification mediums each doped with a rare earth element having a gain peak value for a wavelength; gain equalizers disposed between said optical amplification mediums, each equalizing a gain in a wavelength band in which the gain is tilted at a wavelength different from the wavelength having the peak value; and a temperature control section controlling a temperature of each of the optical amplification mediums to be a predetermined temperature. In such a constitution, the efficiency evaluation value can be increased by the temperature control of the optical amplification medium.

In a further aspect of the present invention, the optical amplifier may comprise: a plurality of optical amplification mediums each doped with a rare earth element having a gain peak value for a wavelength; and gain equalizers disposed between said optical amplification mediums, each equalizing a gain in a wavelength band in which the gain is tilted at a wavelength different from the wavelength having the peak value, wherein the optical amplification medium is doped with an additive that increases a gain coefficient of a wavelength in a band equalized by the gain equalizer. In such a constitution, the efficiency evaluation value can be increased by using the optical amplification medium doped with the additive that increases the gain coefficient corresponding to the wavelength band equalized by the gain equalizer.

In a still further aspect of the present invention, the optical amplifier may comprise: a plurality of optical amplification mediums each doped with a rare earth element having a gain peak value for a wavelength; and gain equalizers disposed between said optical amplification mediums, each equalizing a gain in a wavelength band in which the gain is tilted at a wavelength different from the wavelength having the peak value, wherein for the optical amplification medium, a base material that increases a gain coefficient of a wavelength in a band equalized by the gain equalizer is used rather than a silica base material. In such a constitution, by using the optical amplification medium made of a base material (host glass) that increases the gain coefficient corresponding to the wavelength band equalized by the gain equalizer, the efficiency evaluation value can be increased in comparison with the optical amplification medium made of the silica base material.

The other objects, features and advantages of the present invention will be apparent from the following description of the embodiments with reference to the accompanying drawings.

DETAILED DESCRIPTION OF THE INVENTION

Hereinafter, embodiments of the present invention will be described with reference to drawings.

First, with reference to an optical amplifier that uses a rare earth element doped optical fiber (for example, EDF) as an optical amplification medium for performing optical wavelength division multiplex transmission, there will be described a basic concept for realizing an efficiency improvement of optical amplification for a wavelength band (for example, S-band) different from a typically known amplification band.

Figure 1:
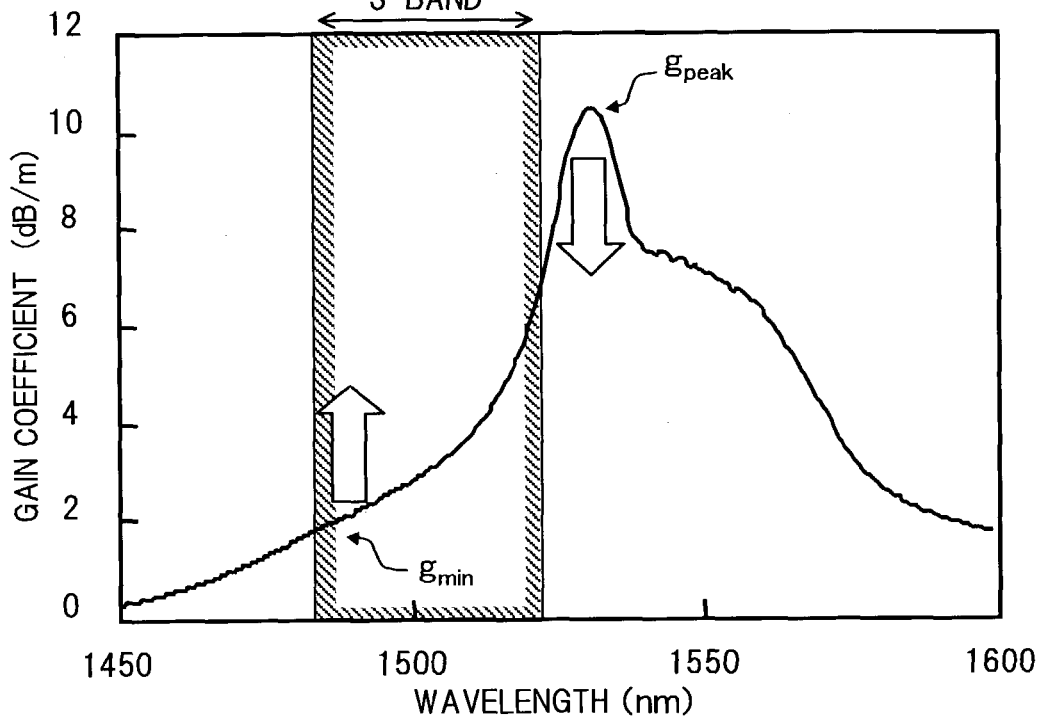
FIG. 1 is a diagram for expressing a basic concept of the present invention.

FIG. 1 is a diagram for explaining a basic concept of the present invention in which an example of a gain wavelength characteristic of a typical EDF is shown.

As shown in FIG. 1, the gain wavelength characteristic has a gain peak at the outside, on a longer wavelength side, of an S-band signal band corresponding to an area enclosed by oblique lines (more specifically, in the vicinity of 1530 nm). In the area enclosed by the oblique lines, a gain has a characteristic that is tilted with respect to the wavelength. With regard to such a gain characteristic, in order to increase efficiency of optical amplification for S-band, for example, (A) a gain coefficient in S-band may be increased, or (B) the gain peak at the outside of the signal band may be reduced to suppress growth of ASE light in the vicinity of 1530 nm. In this case, since it becomes important to keep a balance between the gain coefficient at the inside of the signal band and the gain peak at the outside of the signal band, it is effective to define η shown in the following equation (2) as a parameter value (an efficiency evaluation value) representing this balance, to design the optical amplifier while paying attention to the parameter η:

$$\eta = g_{min}/g_{peak} \qquad (2)$$

where $g_{min}$ is a minimum gain coefficient at the inside of the signal band when a pumping state of the optical amplification medium is maximum, and $g_{peak}$ is a gain peak value (a maximum value of the gain coefficient) at the outside of the signal band. When the conditions (A) or (B) described above are satisfied, a value of the parameter η is increased. Therefore, by designing the optical amplifier so as to more increase the parameter η, the optical amplifier suitable for the optical amplification for S-band can be realized.

Figure 2:
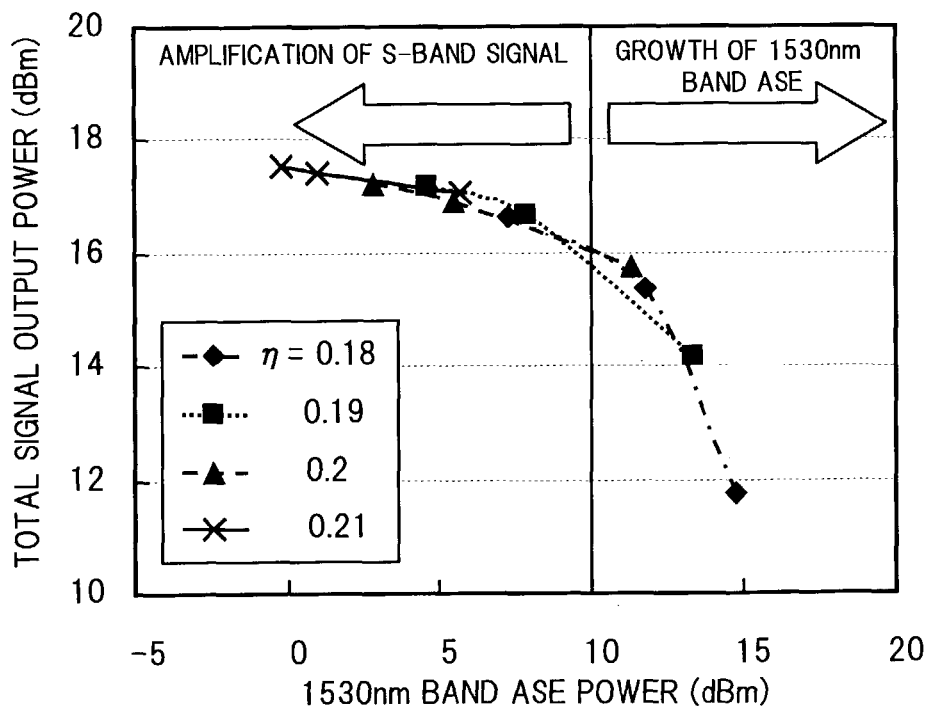
FIG. 2 is a diagram showing a relation of total output power of S-band signal light to ASE optical power in 1530 nm band according to a parameter $\eta$.

FIG. 2 shows an example of a relation of total output power of S-band signal light to ASE optical power in 1530 nm band according to each value of a parameter η (0.18-0.21). It can be seen from FIG. 2 that the total output power of the S-band signal light is reduced drastically as the ASE light at the outside of the signal band grows. This is because pumping power to be supplied to the EDF is consumed by the growth of the ASE light. However, as the value of the parameter η is increased, the growth of the ASE light is suppressed and the pumping light power is mainly consumed by the amplification of the S-band signal light.

Figure 3:
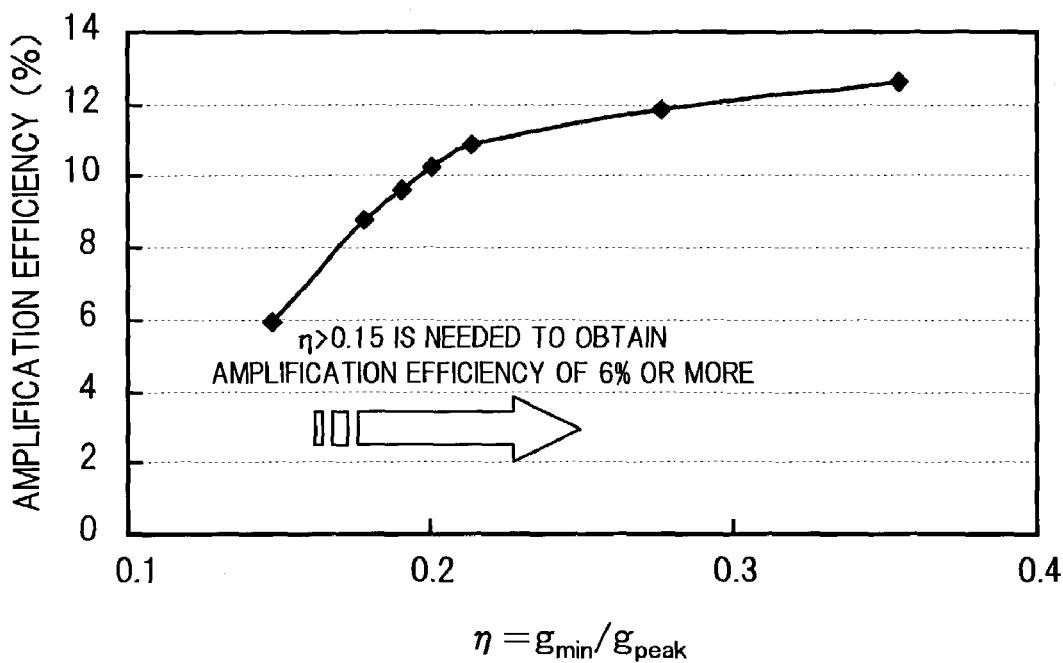
FIG. 3 shows an example of a relation of amplification efficiency to the parameter $\eta$.

FIG. 3 shows an example of a relation of amplification efficiency to the parameter η. Here, the amplification efficiency is a value expressed by the following equation (3):

$$\text{amplification efficiency}(\%) = \qquad (3)$$
$$\frac{(\text{total output light power}) - (\text{total input light power})}{(\text{total pumping light power})} \times 100$$

It can be seen from FIG. 3 that the amplification efficiency is also increased as the parameter η is increased. More specifically, for example, in order to obtain the amplification efficiency of 6% or more, the parameter η may be set to 0.15 or more. Thus, the parameter η being a ratio between the gain peak value $g_{peak}$ at the outside of the signal band and the minimum value $g_{min}$ of the gain coefficient at the inside of the signal band is a very useful index in designing the optical amplifier that has the gain peak at the outside of the signal band.

In the above description, an EDF is assumed as the rare earth element doped optical fiber serving as the optical amplification medium, and S-band that is located at a shorter wavelength side of the peak wavelength is assumed as the wavelength band different from the peak wavelength. However, the present invention is not limited thereto, and it is possible to use an optical fiber doped with any rare earth element other than Erbium is used as the optical amplification medium, and to assume any wavelength band other than S-band in which the peak wavelength is located at the outside of the signal band.

In the optical amplifier according to the present invention constituted based on the design focusing on the parameter η as described above, the efficiency of the optical amplification for a new wavelength band such as S-band can be improved and the constitution can be simplified. Hereinafter, specific embodiments of the optical amplifier according to the present invention will be described in detail.

Figure 4:
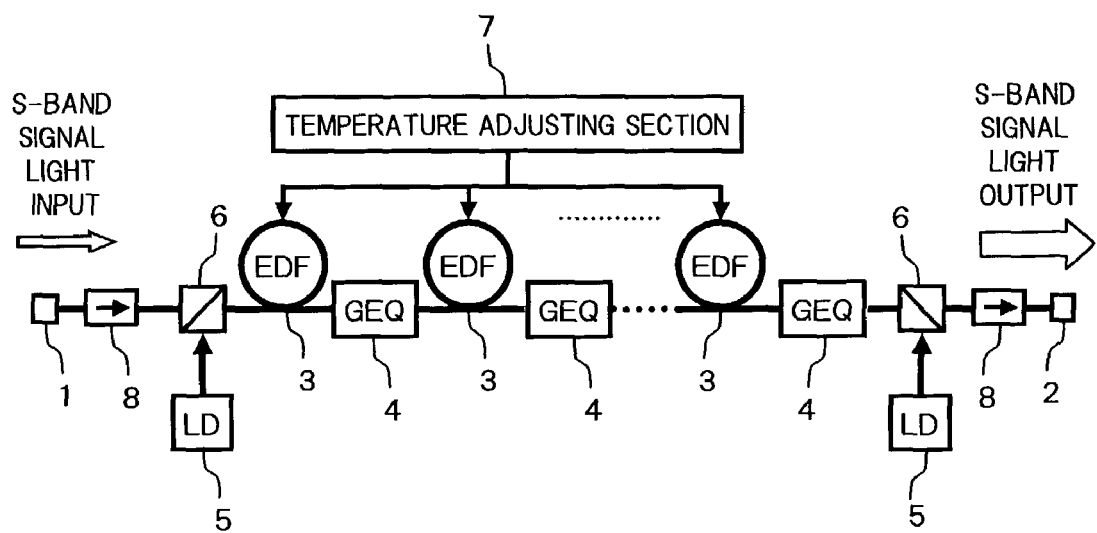
FIG. 4 is a block diagram showing a constitutional example of an S-band EDFA according to a first embodiment of the present invention.

FIG. 4 is a block diagram showing a constitutional example of an S-band EDFA according to a first embodiment of the present invention.

In FIG. 4, the S-band EDFA comprises, for example, a plurality of silica based Erbium doped optical fiber (EDF) 3 that are cascade connected between an input port 1 and an output port 2, gain equalizers (GEQ) 4 inserted respectively at an output end of each EDF 3, pumping light sources 5 and WDM couplers 6 for supplying pumping light to each EDF 3, a temperature adjusting section 7 adjusting a temperature of each EDF 3, and optical isolators 8 inserted at a latter state of the input port 1 and at a previous stage of the output port 2, respectively.

A typical silica based EDF used for a conventional EDFA corresponding to C-band or L-band can be used as each EDF 3. It is assumed that the length of each EDF 3 is adjusted appropriately so that a required gain can be obtained in the present optical amplifier.

Each GEQ 4 is a known optical filter having a transmission wavelength characteristic that can suppress ASE light outside S-band that is generated in each EDF 3, especially, ASE light generated in the vicinity of 1530 nm, and at the same time, can compensate for a tilt of the gain coefficient in S-band. More specifically, for example, a Fabry-Perot etalon filter, a dielectric multi-layer film filter, or a fiber grating filter can be used. Note, it is assumed that each GEQ 4 can transmit the pumping light.

Each pumping light sources 5 is a typical pumping light source that generates pumping light in a wavelength band, capable of pumping each EDF 3 (980 nm band, 1480 nm band and the like, for example). Here, the pumping light output from the pumping light source 5 positioned at the input side is multiplexed at the WDM coupler 6 positioned at the input side in the same direction as a propagation direction of the signal light, to be supplied to each EDF 3. On the other hand, the pumping light output from the pumping light sources 5 positioned at the output side is multiplexed at the WDM couplers 6 positioned at the output side in an opposite direction to the propagation direction of the signal light, to be supplied to each EDF 3. It is assumed that power of the pumping light supplied to each EDF 3 from each pumping light source 5 is set so that a population inversion rate of the EDF 3 becomes 0.7 or more. Note, the constitution of bi-directional pumping type is shown in the example in FIG. 4. However, the present invention is not limited thereto and it is possible to constitute a forward pumping type or a backward pumping type.

The temperature adjusting section 7 that can adjust the temperature of each EDF 3 measures the temperature of each EDF 3 and adjusts the temperature of each EDF 3 to a predetermined temperature by temperature control means such as a heater provided in each EDF 3 or detects the parameter η based on the output of the optical amplifier and adjusts the temperature of each EDF, so as to realize the improvement of efficiency of the optical amplification for S-band.

Each optical isolator 8 is a known optical device transmitting light in only one direction. The optical isolator 8 disposed at the input side transmits the S-band signal light input to the input port 1 to the WDM coupler 6 at the input side and, at the same time, blocks transmission of light that is propagated in a direction opposite to the propagation direction of the signal light. On the other hand, the optical isolator 8 disposed at the output side transmits the light having passed through the WDM coupler 6 at the output side to the output port 2 and, at the same time, blocks transmission of light that is input from outside via the output port 2.

In the S-band optical amplifier of the constitution described above, an increase of the parameter η can be realized by utilizing temperature dependence of the gain coefficient of the EDF. Hereinafter, a temperature characteristic of the gain coefficient of the EDF will be described specifically with reference to FIGS. 5-8.

Figure 5:
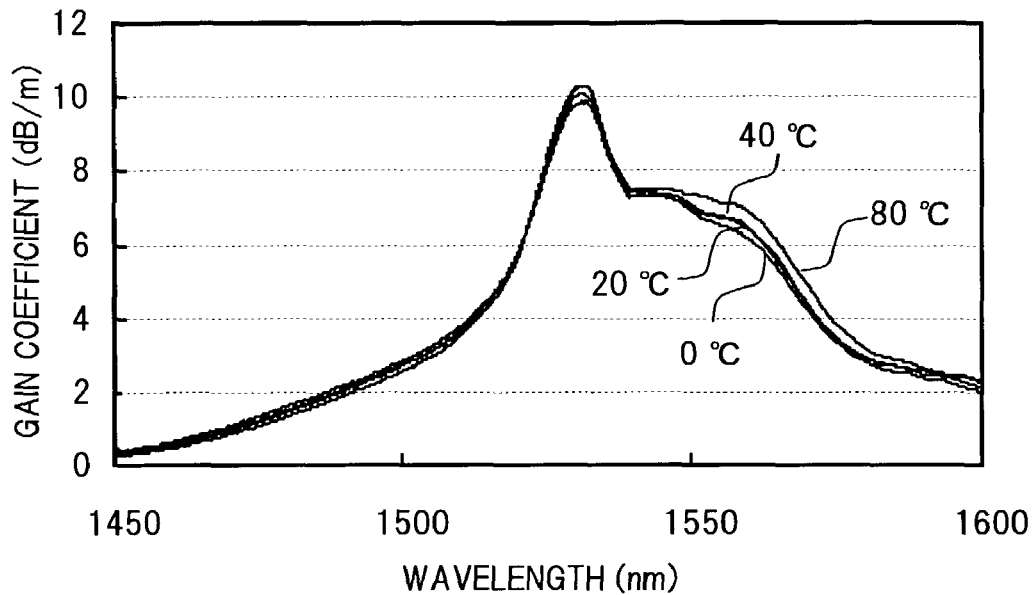
FIG. 5 is a diagram showing a change in a gain coefficient of EDF with respect to a temperature change in the first embodiment.
Figure 6:
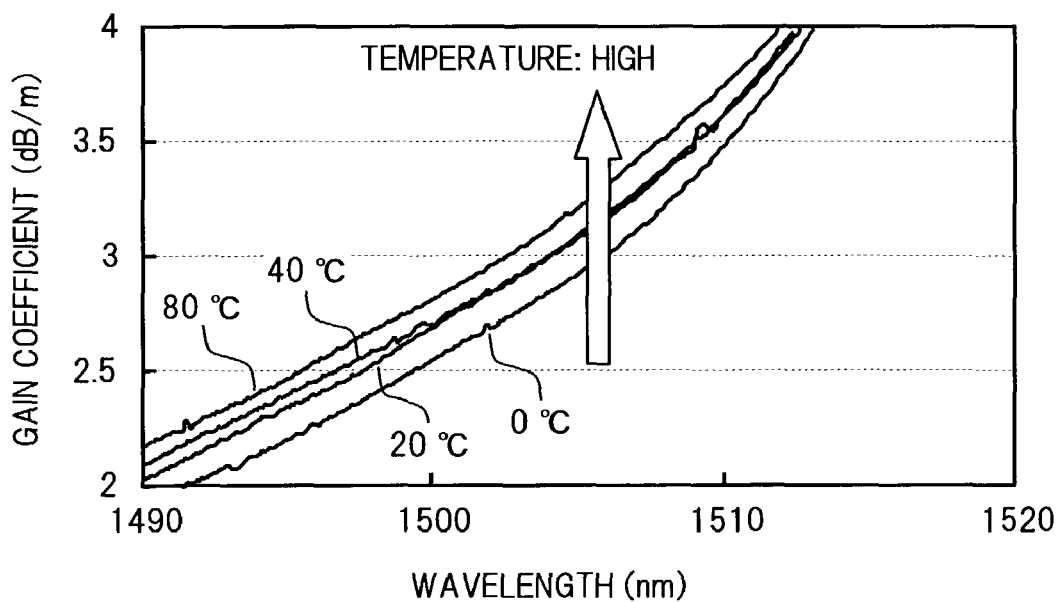
FIG. 6 is an enlarged diagram of a characteristic for S-band shown in FIG. 5.
Figure 7:
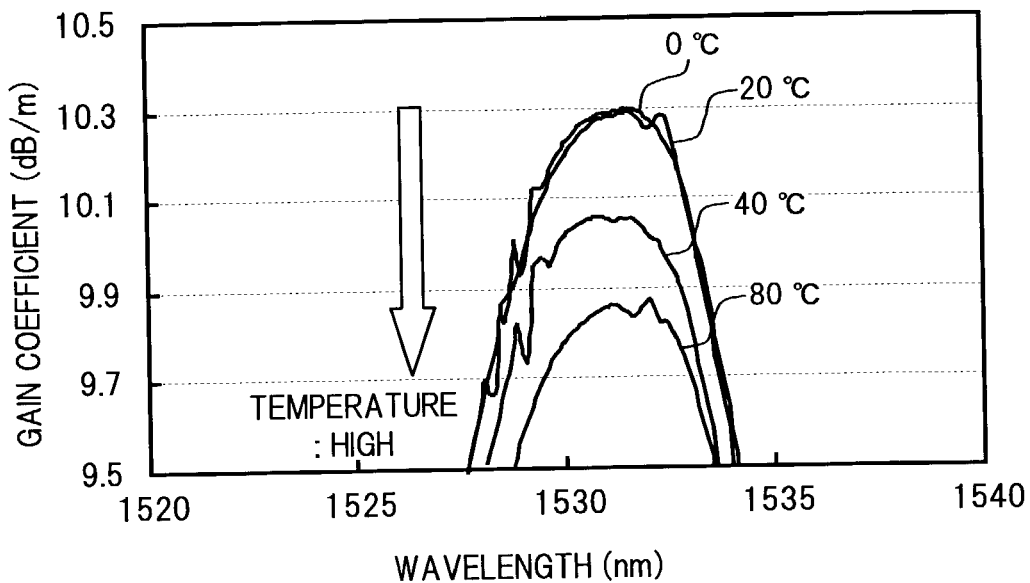
FIG. 7 is an enlarged diagram of the characteristic in the vicinity of 1530 nm shown in FIG. 5.
Figure 8:
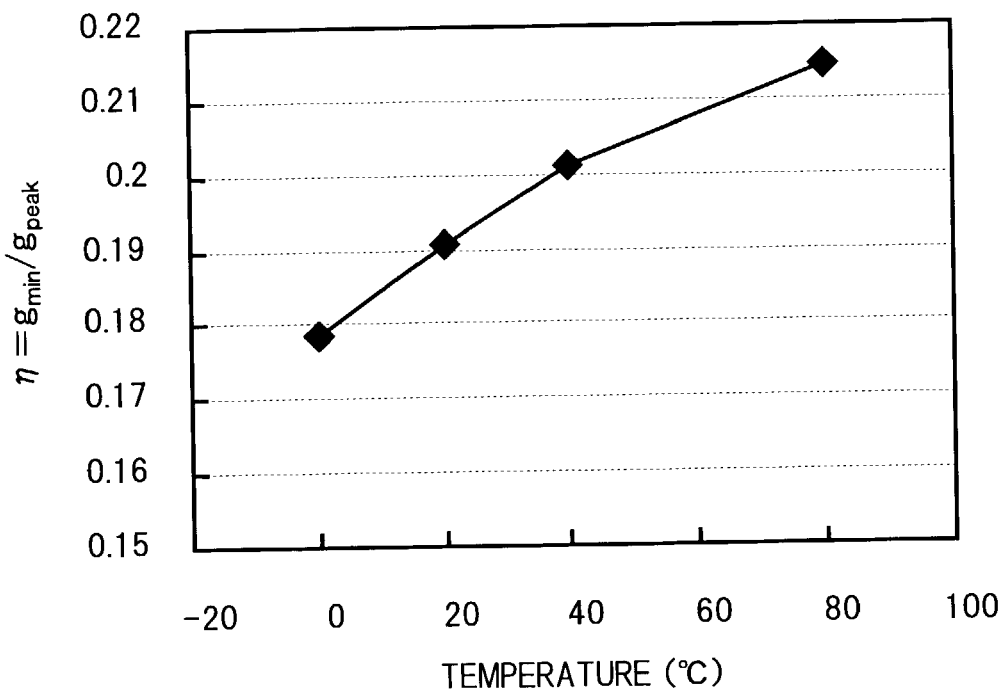
FIG. 8 is a diagram showing a relation between a temperature of the EDF and the parameter $\eta$ in the first embodiment.

FIG. 5 is a diagram showing a change in the gain coefficient of the EDF with respect to a change in temperature of 0° C., 20° C. (room temperature), 40° C. and 80° C., for example. Further, FIG. 6 is an enlarged diagram of the characteristic shown in FIG. 5 for the S-band, and FIG. 7 is an enlarged diagram of the characteristic in the vicinity of 1530 nm shown in FIG. 5. Still further, FIG. 8 is a diagram showing a relation between the temperature of the EDF and the parameter η.

It can be seen from FIGS. 5-7 that the gain coefficient of the EDF has temperature dependence such that, as the temperature of the EDF rises, the gain coefficient in S-band is increased (FIG. 6) and the gain coefficient peak in the vicinity of 1530 nm is lowered (FIG. 7). Therefore, as shown in FIG. 8, as the temperature of the EDF rises, the value of the parameter η is increased. Accordingly, by holding the EDF in a high temperature, it becomes possible to improve the amplification efficiency of the S-band EDFA.

Here, an amplification characteristic of the S-band EDFA in the first embodiment will be described in detail.

Figure 9:
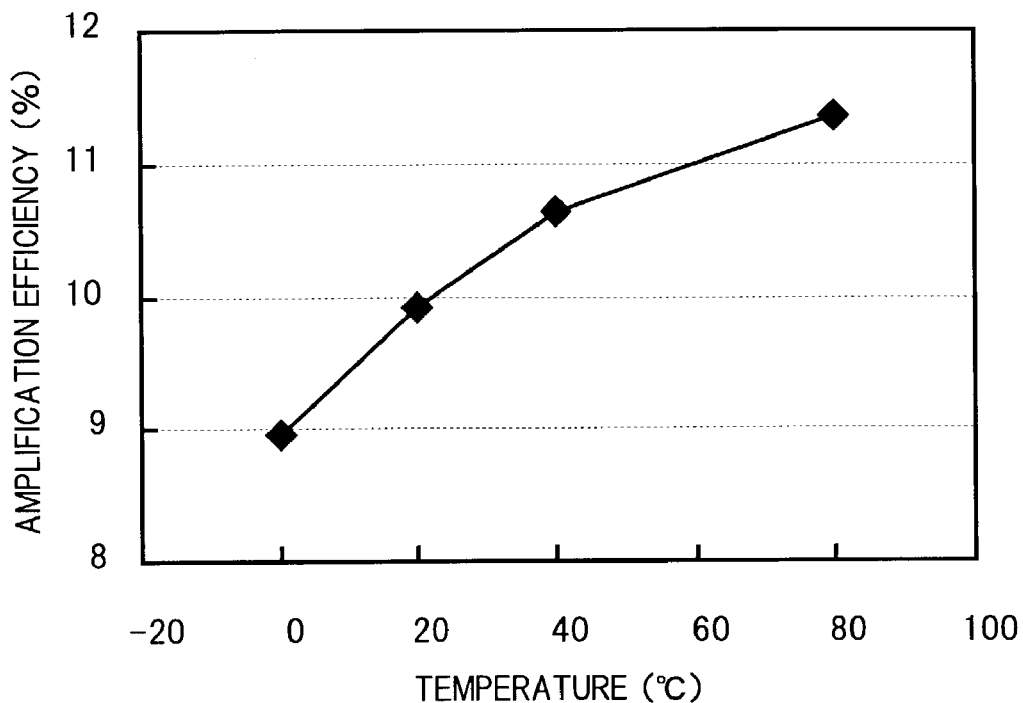
FIG. 9 is a diagram showing temperature dependence of the amplification efficiency in the first embodiment.
Figure 10:
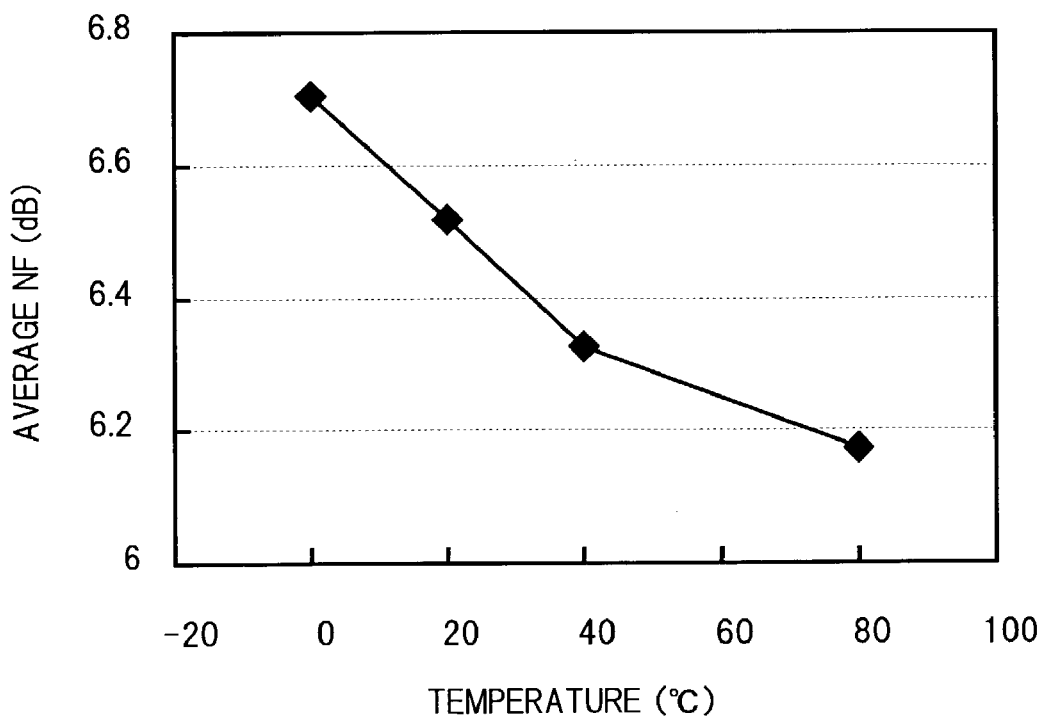
FIG. 10 is a diagram showing temperature dependence of an average NF in the first embodiment.

FIG. 9 is a diagram showing temperature dependence of the amplification efficiency of this EDFA. Further, FIG. 10 is a diagram showing temperature dependence of an average NF (noise figure) of this EDFA. Note, each temperature dependence in FIGS. 9 and 10 shows a characteristic of when each EDF 3 is constituted in five stages wherein the length of EDF per one stage is 4 m and forward and backward pumping power is 240 mW each, for the constitutional example shown in FIG. 4. In this case, for S-band signal light, optical signals of 40 channels are disposed with 100 GHz spacing in the wavelength band of from 1489 nm to 1519 nm, and input light power to each channel is −15 dBm/ch.

As can be seen from FIGS. 9 and 10, by increasing the temperature of the EDF from 20° C. to 80° C., for example, the amplification efficiency is improved by about 1.5% and the average NF is improved by about 0.34 dB.

Further, although the amplification characteristic of the S-band EDFA described above is an example of when each EDF is constituted in the five stages, it has been confirmed that the values of the amplification efficiency and the average NF also depend on the number of stages of the EDF.

Figure 11:
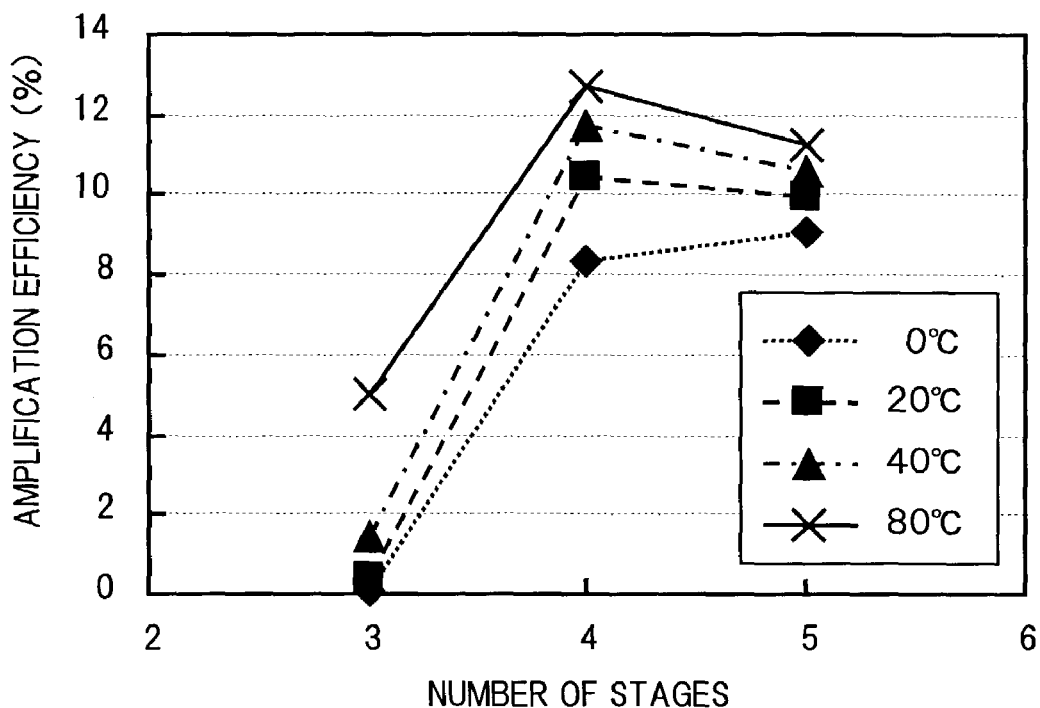
FIG. 11 is a diagram showing dependence of the amplification efficiency on the number of stages in the first embodiment.
Figure 12:
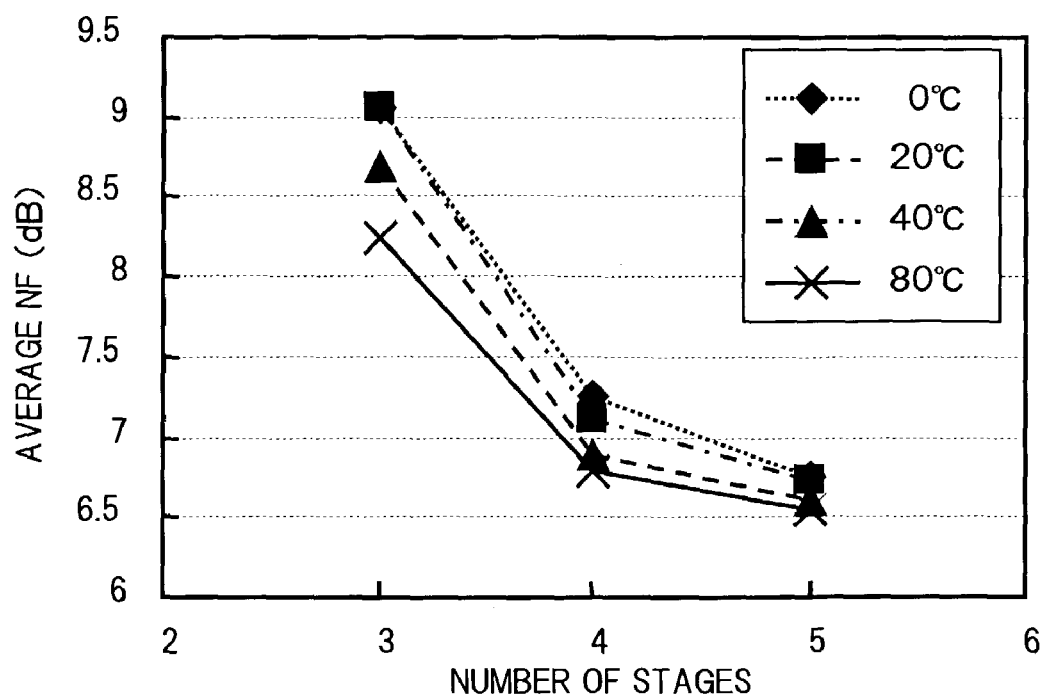
FIG. 12 is a diagram showing dependence of the average NF on the number of stages in the first embodiment.

FIG. 11 shows an example of dependence of the amplification efficiency on the number of stages, and FIG. 12 shows an example of dependence of the average NF on the number of stages. Note, each dependence on the number of stages in FIGS. 11 and 12 shows a characteristic of when the number of stages is changed provided that the total length of the EDF is fixed to 20 m and the output light power per one channel is fixed to 0 dBm/ch. For the S-band signal light, as in the above case, it is assumed that optical signals of 40 channels are disposed with 100 GHz spacing in the wavelength band from 1489 nm to 1519 nm, and input light power to each channel is −15 dBm/ch.

As shown in FIGS. 11 and 12, when the temperature of the EDF is 0° C., the best amplification efficiency and the best average NF are obtained in the constitution of five stages. On the other hand, when the temperature of the EDF is 20° C., 40° C. and 80° C., the best amplification efficiency is obtained in the constitution of four stages while the best average NF is obtained in the constitution of five stages. From such results, it can be understood that the optimal constitution of S-band EDFA is changed depending on the temperature of the EDF 3, that is, the value of the parameter η. More specifically, by increasing the temperature of the EDF 3 to increase the parameter η, the number of stages of the EDF 3 can be reduced, and consequently, it becomes possible to simplify the constitution of the S-band EDFA.

In the first embodiment described above, in the case where the EDF is used as the optical amplification medium, S-band is made to be the signal band, the parameter η is increased by increasing the temperature of the EDF. However, in the present invention, the direction of temperature change is not limited to the rising direction, but it should be determined according to the gain characteristic of the rare earth element doped optical fiber used as the optical amplification fiber and the setting of the signal band.

Next, a second embodiment of the present invention will be described.

In the first embodiment described above, the amplification efficiency is improved and the constitution is simplified, by increasing the temperature of the EDF by the temperature adjusting section 7 to increase the parameter η. On the other hand, in the second embodiment, there will be described an example in which the parameter η is increased by refining an additive in the EDF to be used as the optical amplification medium, in place of the temperature control of the EDF.

Figure 13:
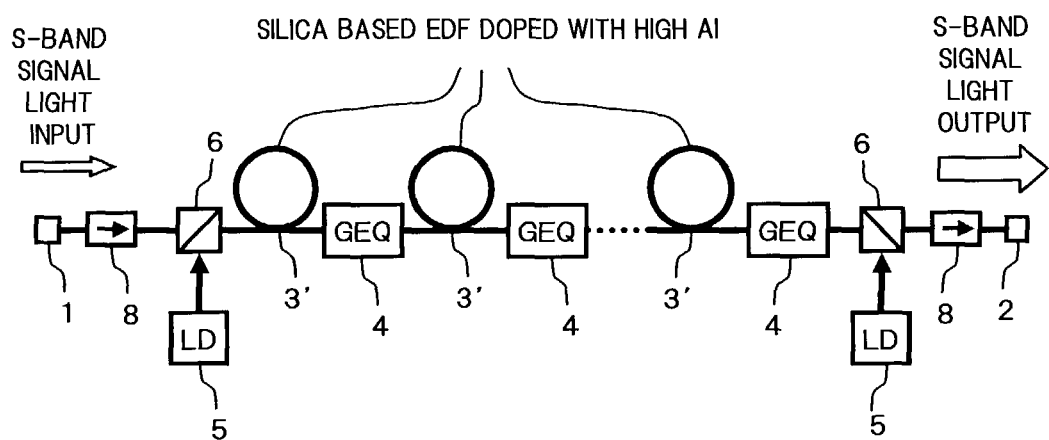
FIG. 13 is a block diagram showing a constitutional example of an S-band EDFA according to a second embodiment of the present invention.

FIG. 13 is a block diagram showing a constitutional example of an S-band EDFA according to the second embodiment of the present invention. Note, same components as in FIG. 4 above are denoted by same reference numerals and description thereof is omitted. Same rule will be applied to other embodiments.

In FIG. 13, the second embodiment differs from the first embodiment in that a silica based EDF 3' doped with aluminum (Al) in high density is used as optical amplification medium at each stage in place of the temperature adjusting section 7. Components other than the above are the same as that in the first embodiment.

Each EDF 3' is the one in which a core of a typical silica based EDF is doped with $Al_2O_3$ or the like. It is known that the gain wavelength characteristic of such an EDF 3' is changed according to the type or amount of additive.

Figure 14:
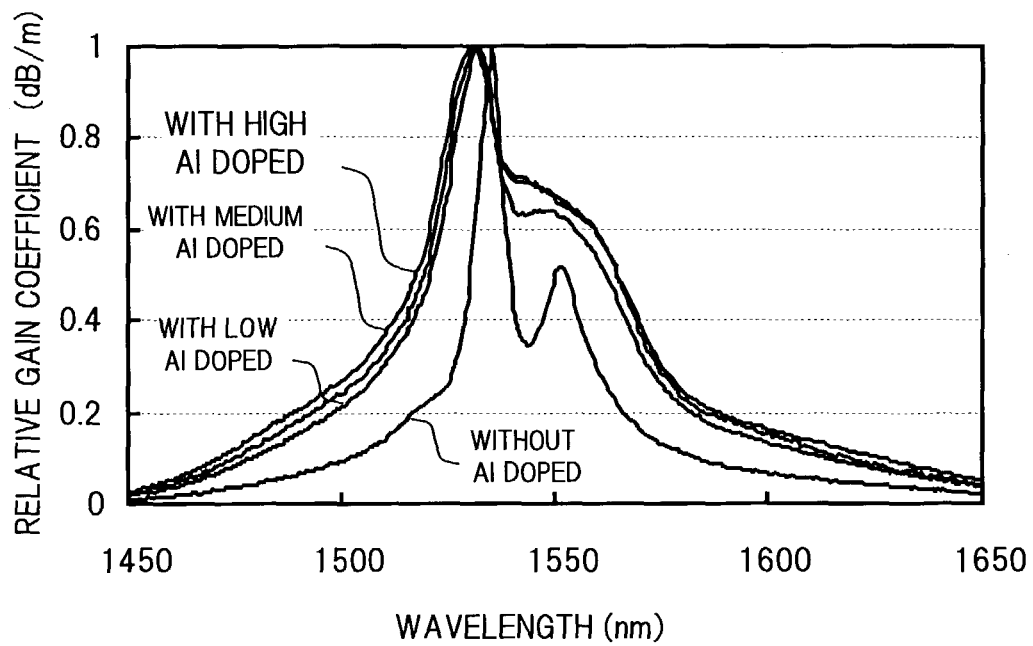
FIG. 14 is a diagram showing dependence of a relative gain coefficient on a doping amount of Al in the second embodiment.

FIG. 14 is a diagram showing dependence of a relative gain coefficient on a doping amount of Al. As apparent from FIG. 14, as the doping amount of Al is increased, the relative gain coefficient for S-band tends to be increased.

More specifically, data in which a relation of each of the parameter η value, the amplification efficiency value and the average NF value to the doping amount of Al is compared is shown in Table 1 as follows. Note, Table 1 shows the data when each EDF 3' is constituted in five stages wherein the length of the EDF per one stage is 4 m, and forward and backward pumping power is 240 mW each, for the constitutional example shown in FIG. 13. In this case, for the S-band signal light, optical signals of 40 channels are disposed with 100 GHz spacing in the wavelength band from 1489 nm to 1519 nm, and input light power to each channel is −15 dBm/ch.

TABLE 1

| | $\eta$ ($g_{min}/g_{peak}$) | amplification efficiency (%) | average NF (dB) |
|---|---|---|---|
| without Al doped | 0.06 | 0.5 | 8.6 |
| with low Al doped | 0.15 | 6.7 | 6.9 |
| with medium Al doped | 0.18 | 9.2 | 6.5 |
| with high Al doped | 0.20 | 10.3 | 6.4 |

As shown in the data of Table 1, in the case where the EDF 3' doped with Al in high density is used, it can be seen that the value of the parameter $\eta$ is increased by three times or more so that each value of the amplification efficiency and the average NF is also improved, in comparison with the case where the EDF that is not doped with Al at all.

As described above, according to the second embodiment, by constituting the S-band EDFA using the EDF 3' doped with Al in higher density, it is possible to increase the parameter $\eta$ to improve the amplification efficiency. Further, as in the first embodiment described above, since the amplification efficiency is improved to enable the reduction of the number of the EDF 3', it becomes possible to simplify the constitution of the S-band EDFA.

Note, in the second embodiment described above, in the case where the additive for EDF is Al and S-band is made to be the signal band, the parameter $\eta$ is increased by increasing the doping amount of Al. However, the additive for the EDF is not limited to Al, but any of various substances capable of changing the gain wavelength characteristic of the EDF so as to increase the parameter $\eta$ can be used as the additive. Specific examples of the additives other than Al may include phosphorus, boron and the like.

Next, a third embodiment of the optical amplifier according to the present invention will be described.

In the second embodiment described above, the parameter $\eta$ is increased by using the silica based EDF in which the doping amount of Al is increased as the optical amplification medium. On the other hand, in the third embodiment, there will be described an example in which the parameter $\eta$ is increased by refining a composition of base material (host glass) to be used as the optical amplification medium.

Figure 15:
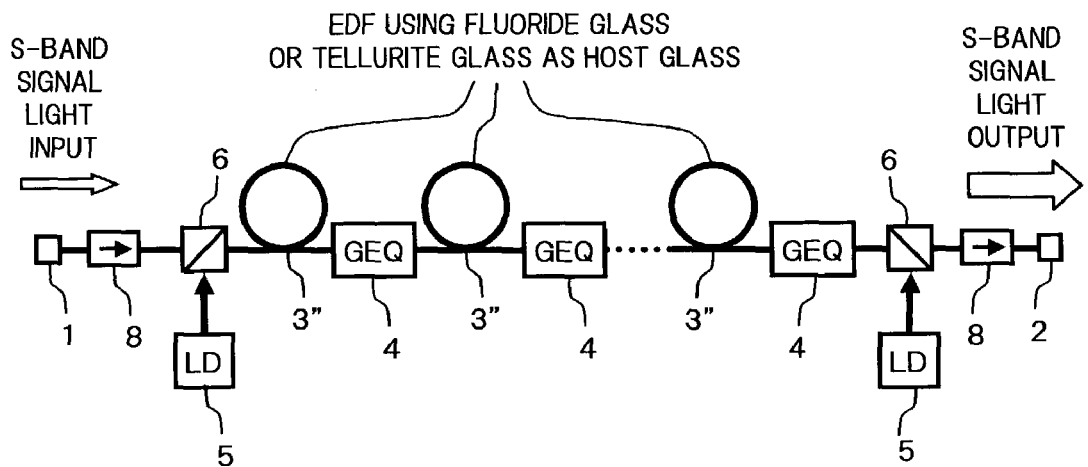
FIG. 15 is a block diagram showing a constitutional example of an S-band EDFA according to a third embodiment of the present invention.

FIG. 15 is a block diagram showing a constitutional example of an S-band EDFA according to the third embodiment of the present invention.

In FIG. 15, the constitution of the third embodiment differs from the second embodiment in that, instead of the silica based EDF 3' doped with Al in high density, EDF 3" using either fluoride glass or tellurite glass as the host glass, for example, is used as the optical amplification medium at each stage. Components other than the above are the same as those of the second embodiment.

Each EDF 3" is the one in which an optical fiber using the fluoride glass or the tellurite glass as the host glass is doped with erbium and the like. Generally, it is known that the gain wavelength characteristic of the EDF 3 is changed depending on the composition of the host glass.

Figure 16:
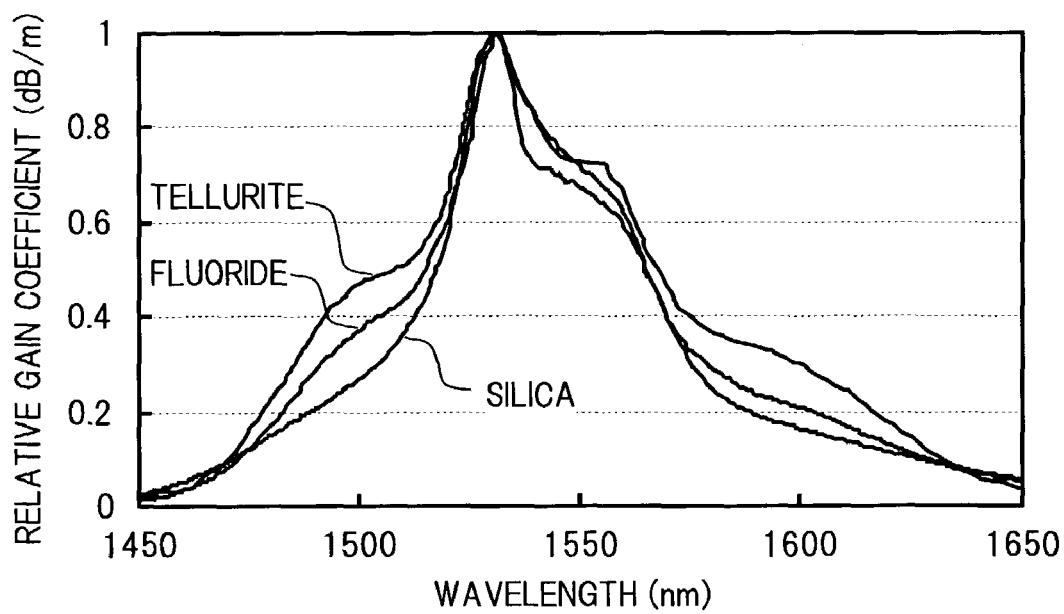
FIG. 16 is a diagram showing dependence of the relative gain coefficient of the EDF on host glass.

FIG. 16 is a diagram showing dependence of the relative gain coefficient on the host glass. Here, there is shown the relative gain coefficient of each EDF in which each of three types of glasses, the silica glass (doped with Al in high density), the fluoride glass and the tellurite glass, is used as the host glass. As shown in FIG. 16, it can be seen that the profile of the relative gain coefficient differs significantly depending on the type of the host glass, or in other words, the relative gain coefficient for S-band tends to be increased when the fluoride glass or the tellurite glass is used as the host glass. Specifically, data in which the parameters $\eta$ for various types of the host glass are compared is shown in Table 2:

TABLE 2

| | $\eta$ ($g_{min}/g_{peak}$) |
|---|---|
| silica glass (doped with Al in high density) | 0.20 |
| fluoride glass | 0.28 |
| tellurite glass | 0.36 |

As can be seen from the data in Table 2, in order to increase the parameter $\eta$ for the S-band EDFA, the fluoride glass and the tellurite glass is suitable for the host glass.

Here, the amplification characteristic of the S-band EDFA according to this embodiment will be described specifically. Hereinafter, the feature of this embodiment will be considered through the comparison of the case where the tellurite glass, for example, is used as the host glass for each EDF 3" and the case where the silica glass is used as the host glass, for the amplification characteristic of the S-band EDFA.

Figure 17:
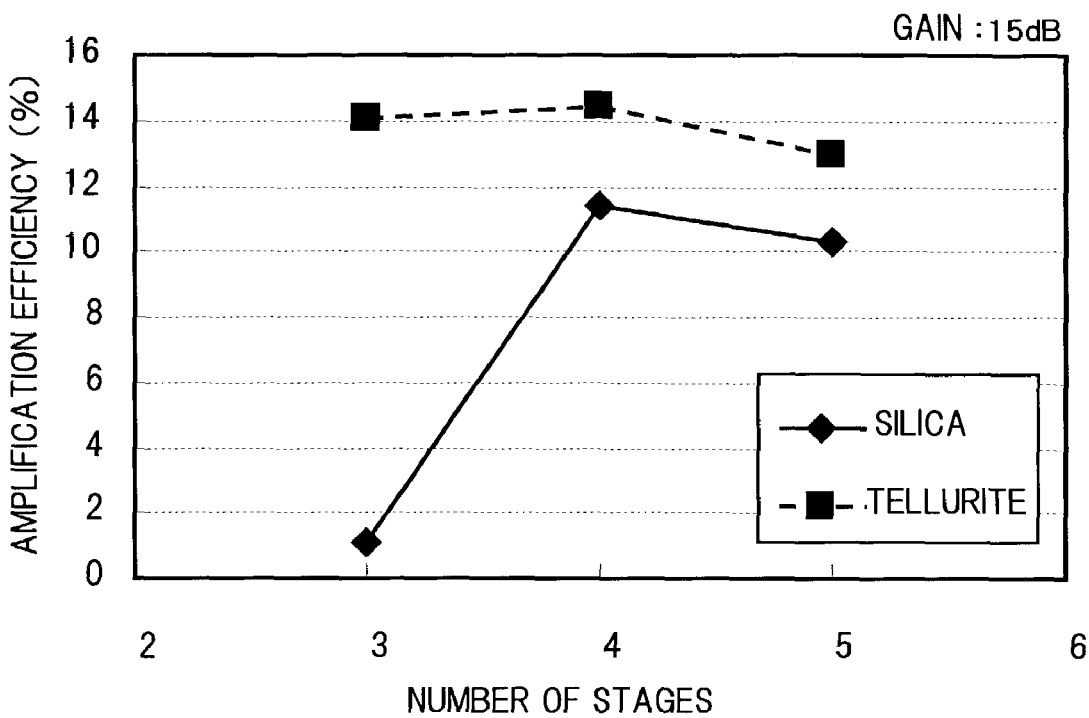
FIG. 17 is a diagram explaining dependence of the amplification efficiency on the number of stages when the gain is set to 15 dB in the third embodiment.
Figure 18:
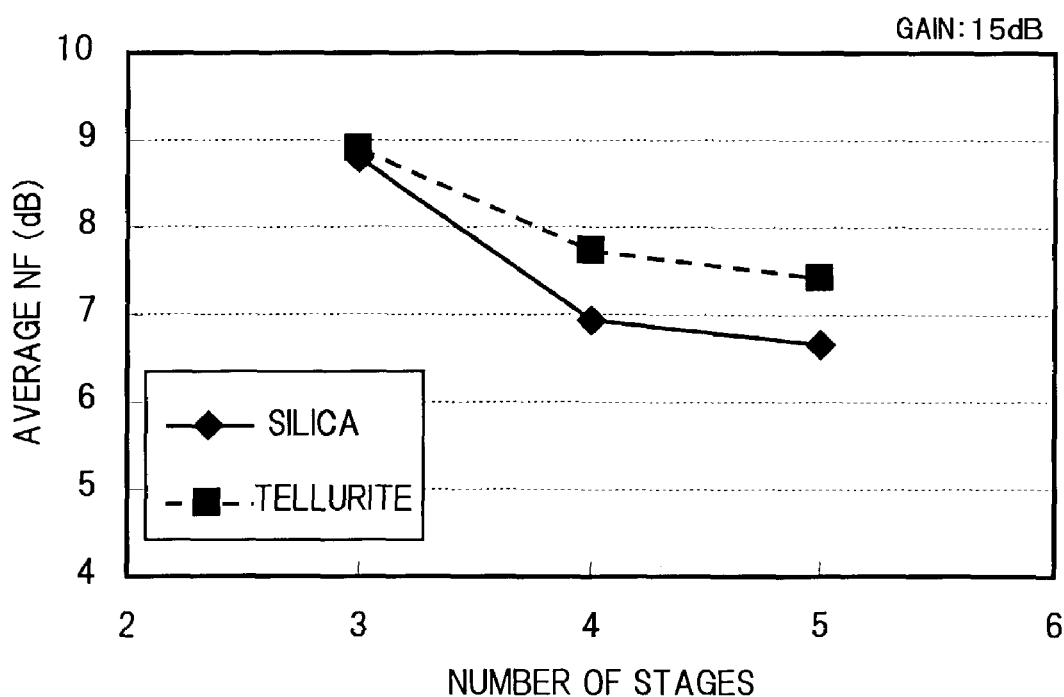
FIG. 18 is a diagram explaining dependence of the average NF on the number of stages when the gain is set to 15 dB in the third embodiment.

FIG. 17 shows an example of dependence of the amplification efficiency on the number of stages and FIG. 18 shows an example of dependence of the average NF on the number of the stages, in each of the S-band EDFAs using the tellurite glass and the silica glass, respectively. Here, each dependence on the number of stages in FIGS. 17 and 18 shows the characteristic of when the number of stages of EDF is changed provided that the total length of the EDF is fixed to 20 m and the output light power per one channel is fixed to 0 dBm/ch. For the S-band signal light, optical signals of 40 channels are disposed with 100 GHz spacing in the wavelength band from 1489 nm to 1519 nm, and input light power to each channel is −15 dBm/ch. Therefore, the gain of the S-band EDFA is 15 dB in this case.

As can be seen from FIG. 17, in the S-band EDFA using the tellurite glass as the host glass, the amplification efficiency better than that in the S-band EDFA using the silica glass can be achieved, in particular, when each EDF is constituted in three stages, the amplification efficiency is improved by about 13% in comparison with the EDFA using the silica glass. Further, as can be seen from FIG. 18, in the S-band EDFA using the tellurite glass, the average NF is somewhat worse than that in the EDFA using the silica glass, but can obtain the characteristic that is substantially the same as that in the EDFA using the silica glass, by reducing the number of stages of the EDF to constitute three stages, for example.

Figure 19:
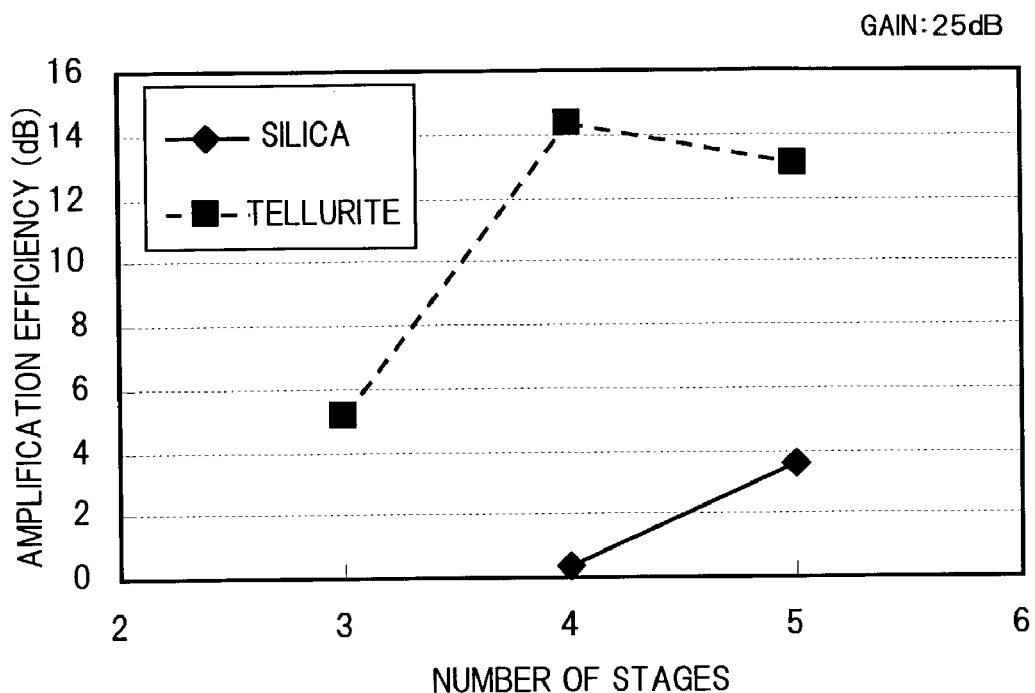
FIG. 19 is a diagram explaining dependence of the amplification efficiency on the number of stages when the gain is set to 25 dB in the third embodiment.
Figure 20:
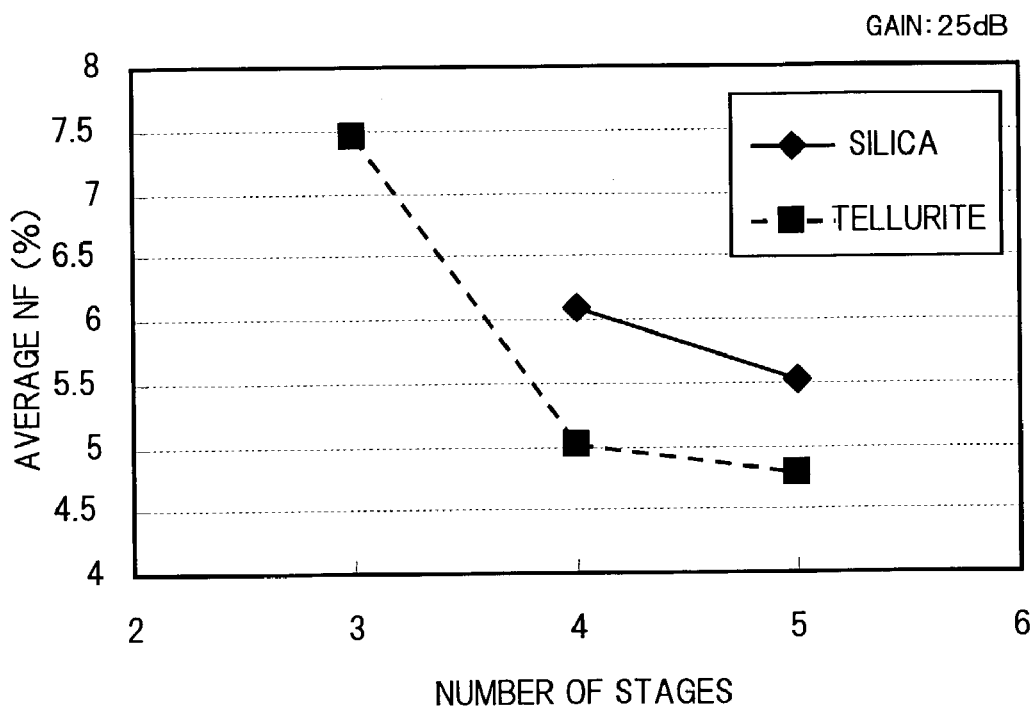
FIG. 20 is a diagram explaining dependence of the average NF on the number of stages when the gain is set to 25 dB in the third embodiment.
Figure 21:
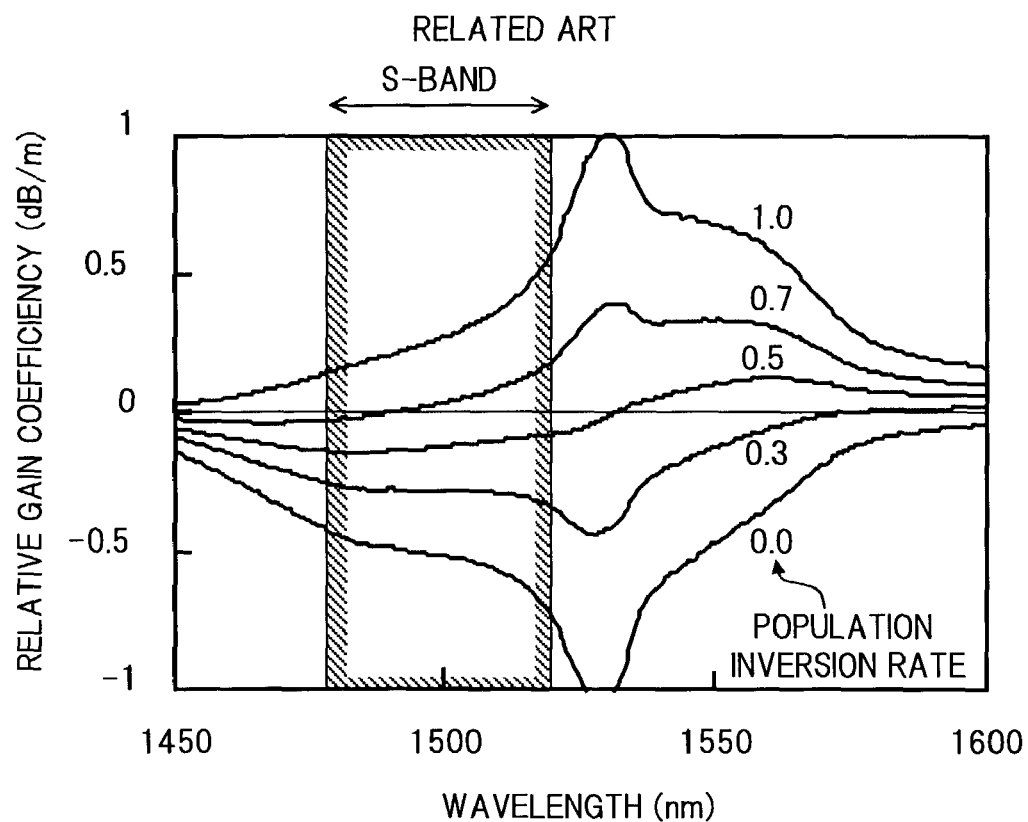
FIG. 21 is a diagram showing dependence of a population inversion rate on a relative gain coefficient in a typical EDF.
Figure 22:
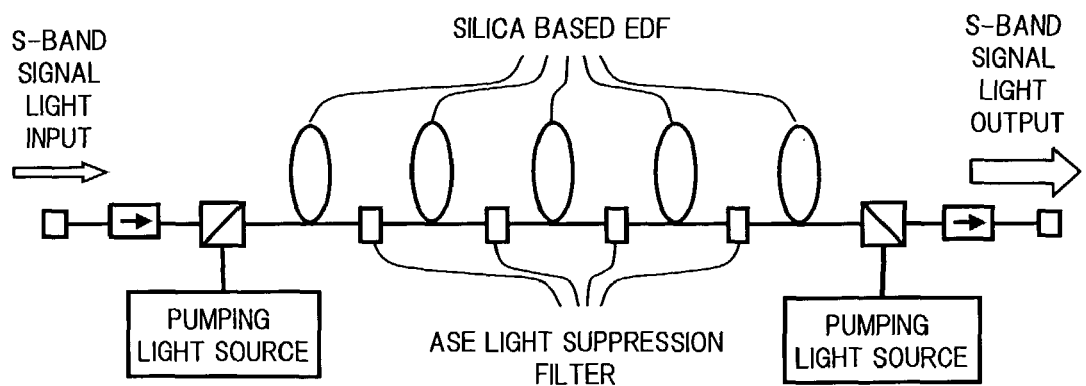
FIG. 22 is a block diagram showing a constitutional example of a conventional S-band EDFA.
Figure 23:
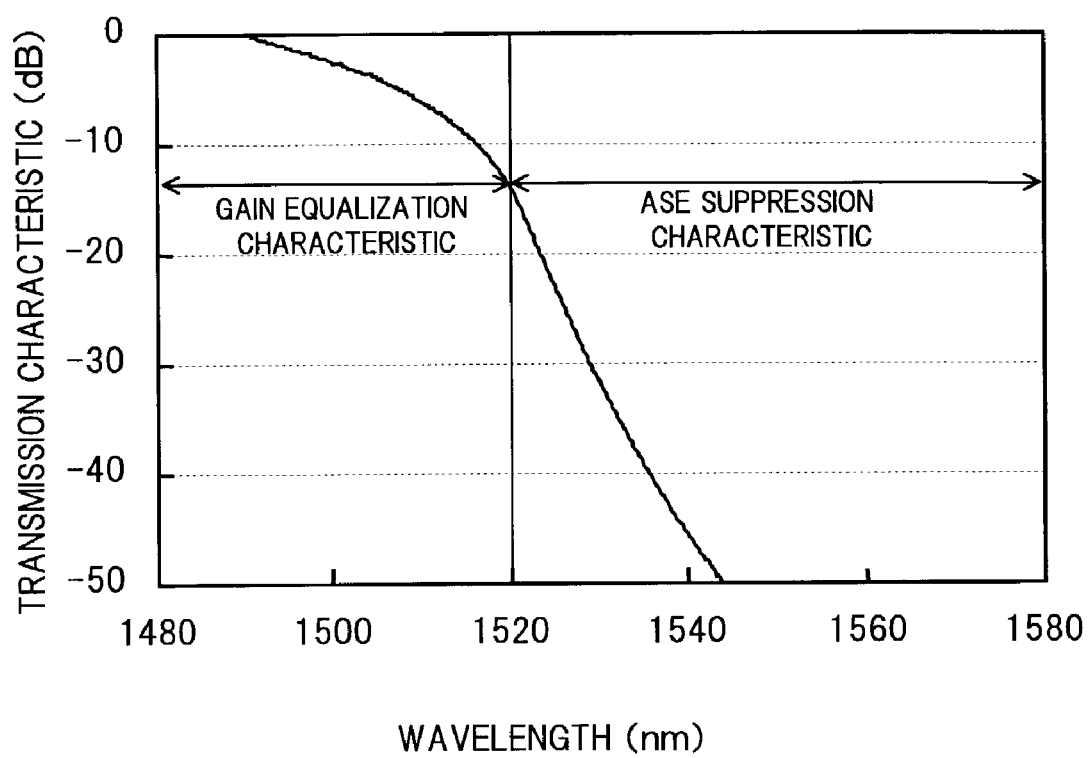
FIG. 23 is a diagram showing a transmission wavelength characteristic of an optical filter used in the S-band EDFA shown in FIG. 22.

Further, the superiority of the tellurite glass as the host glass will be more remarkable by increasing the gain of the S-band EDFA. FIGS. 19 and 20 show the dependence of the amplification efficiency on the number of stages and the dependence of the average NF on the number of stages, respectively, in the case where the input light power of each channel is set to −25 dBm/ch to set the gain of the S-band EDFA to 25 dB, for example.

As can be seen from FIG. 19, in the case where the gain is set to 25 dB, the amplification efficiency in the S-band EDFA using the silica glass as the host glass is significantly worse than the case where the gain is set to 15 dB. On the other hand, the amplification efficiency in the S-band EDFA using the tellurite glass becomes worse when the EDF is constituted in three stages, but the better amplification efficiency can be achieved in the constitutions of four and five stages. Further, as shown in FIG. 20, in the EDFA using the tellurite glass in four or five stages, a better average NF than that in the EDFA using the silica glass can be achieved.

As described above, according to the third embodiment, by constituting the S-band EDFA using the tellurite glass or the fluoride glass as the host glass of the EDF, it becomes possible to increase the parameter η to improve the amplification efficiency, and at the same time, to simplify the constitution of the S-band EDFA.

Here, in the third embodiment described above, when S-band is made to be the signal band, the tellurite glass or the fluoride glass is used as the host glass of the EDF to increase the parameter η. However, the host glass of the EDF is not limited to the above examples, but it is possible to use, as the host glass, any of various materials that change the gain wavelength characteristic of the EDF so as to increase the parameter η. Specific examples of the host glass may include phosphate, borate and the like.

Further, in the above first to third embodiments, the EDFA corresponding to S-band only has been described. However, a plurality of bands of signal light may be amplified collectively in one optical amplifier by combining the existing C-band EDFA, the L-band EDFA and the like. More specifically, it is possible to connect the existing EDFA for other band in parallel to the S-band EDFA according to the present invention, so that input signal light is branched for each band to perform the optical amplification in each EDFA.

What is claimed is:

1. An optical amplifier comprising:
a plurality of optical amplification mediums each doped with a rare earth element having a center wavelength of a gain peak appearing outside a signal band;
gain equalizers disposed between said optical amplification mediums, each equalizing a gain in the signal band in which the gain is tilted at a wavelength different from the wavelength having said peak value outside the signal band and each suppressing growth of an ASE light generated at a band which includes a wavelength of the gain peak and is located outside of the signal band; and
a temperature control section raising or lowering a temperature of each of said optical amplification mediums so that an efficiency evaluation value becomes η 0.15 or more, the efficiency value η is represented by:

$$\eta = g_{min}/g_{peak}$$

where $g_{min}$ is a minimum value of the gain coefficient at the inside of the signal band, and $g_{peak}$ is a maximum value of the gain coefficient at the outside of the signal band when said optical amplification medium is pumped at an inversion ratio of 1.0.

2. An optical amplifier comprising:
a plurality of optical amplification mediums each doped with a rare earth element having a center wavelength of a gain peak appearing outside a signal band; and
gain equalizers disposed between said optical amplification mediums, each equalizing a gain in the signal band in which the gain is tilted at a wavelength different from the wavelength having said peak value outside the signal band, and each suppressing growth of an ASE light generated at a band which includes a wavelength of the gain peak and is located outside of the signal band,
wherein said optical amplification medium is doped with an additive that increases a gain coefficient in the wavelength band equalized by said gain equalizer, so that an efficiency evaluation value η becomes 0.15 or more, the efficiency evaluation value η is represented by:

$$\eta = g_{min}/g_{peak}$$

where $g_{min}$ is a minimum value of the gain coefficient at the inside of the signal band by a maximum value of the gain coefficient at the outside of the signal band when said optical amplification medium is pumped at an inversion ratio of 1.0.

3. An optical amplifier comprising:
a plurality of optical amplification mediums each doped with a rare earth element having a center wavelength of a gain peak appearing outside a signal band; and
gain equalizers disposed between said optical amplification mediums, each equalizing a gain in the signal band in which the gain is tilted at a wavelength different from the wavelength having said peak value outside the signal band, and each suppressing growth of an ASE light generated at a band which includes a wavelength of the gain peak and is located outside of the signal band,
wherein for the optical amplification medium, a base material that increases a gain coefficient in the wavelength band equalized by said gain equalizer is used rather than a silica base material, so that an efficiency evaluation value η becomes 0.15 or more, the efficiency evaluation value is η represented by:

$$\eta = g_{min}/g_{peak}$$

where $g_{min}$ is a minimum value of the gain coefficient at the inside of the signal band, and $g_{peak}$ is a maximum value of the gain coefficient at the outside of the signal band when said optical amplification mediums are pumped at an inversion ratio of 1.0.

4. An optical amplifier according to claim 1, wherein the center wavelength of said gain peak is located at the outside of the signal band on a longer wavelength side.

5. An optical amplifier according to claim 4, wherein said signal band is a wavelength band of from 1480 nm to 1530 nm.

6. An optical amplifier according to claim 1,
wherein when said optical amplification medium is an erbium doped optical fiber, and
said temperature control section increases the temperature of the erbium doped optical fiber to increase said efficiency evaluation value η.

7. An optical amplifier according to claim 2,
wherein when said optical amplification medium is an erbium doped optical fiber, aluminum is used for said additive, and the doping amount of aluminum is increased, so that said efficiency evaluation value η is increased.

8. An optical amplifier according to claim 3,
wherein when said optical amplification medium is an erbium-doped optical fiber, either fluoride glass or tellurite glass is used as said base material.

9. An optical amplifier according to claim 2, wherein a center wavelength of said gain peak is located at the outside of the signal band on a longer wavelength side.

10. An optical amplifier according to claim 3, wherein a center wavelength of said gain peak is located at the outside of the signal band on a longer wavelength side.

* * * * *

UNITED STATES PATENT AND TRADEMARK OFFICE
CERTIFICATE OF CORRECTION

| | |
|---|---|
| PATENT NO. | : 8,064,130 B2 |
| APPLICATION NO. | : 10/351340 |
| DATED | : November 22, 2011 |
| INVENTOR(S) | : Masato Nishihara et al. |

It is certified that error appears in the above-identified patent and that said Letters Patent is hereby corrected as shown below:

Column 11, Line 43, In Claim 1, delete "becomes η" and insert -- η becomes --, therefor.

Signed and Sealed this
Seventh Day of February, 2012

David J. Kappos
*Director of the United States Patent and Trademark Office*